(12) United States Patent
Crawford et al.

(10) Patent No.: US 11,060,433 B2
(45) Date of Patent: *Jul. 13, 2021

(54) RETENTION OF WIRES IN AN INDUCTION HEATED GASEOUS EMISSIONS TREATMENT UNIT

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto (CA)

( * ) Notice: Subject to any disclaimer, the term of this patent is extended or adjusted under 35 U.S.C. 154(b) by 327 days.

This patent is subject to a terminal disclaimer.

(21) Appl. No.: 15/486,358

(22) Filed: Apr. 13, 2017

(65) Prior Publication Data

US 2017/0218823 A1    Aug. 3, 2017

Related U.S. Application Data

(63) Continuation-in-part of application No. 15/259,858, filed on Sep. 8, 2016, now Pat. No. 10,352,214, which
(Continued)

(51) Int. Cl.
*F01N 3/28* (2006.01)
*F01N 3/022* (2006.01)
(Continued)

(52) U.S. Cl.
CPC ............ *F01N 3/2828* (2013.01); *B01J 35/04* (2013.01); *F01N 3/0222* (2013.01);
(Continued)

(58) Field of Classification Search
CPC ...... F01N 3/0892; F01N 2240/28; F01N 3/01; F01N 13/02; F02B 3/06
(Continued)

(56) References Cited

U.S. PATENT DOCUMENTS 3,779,710 A * 12/1973 Burstein ................ B01D 53/86
219/393
3,785,778 A * 1/1974 Burstein ................ B01D 53/34
126/299 R
(Continued)

FOREIGN PATENT DOCUMENTS

CN       202047299 U  * 11/2011 ............. D07B 5/005
JP        5438267 B2  *  3/2014 ........... G06T 7/0012

OTHER PUBLICATIONS

CN 202047299, Machine Translation, Translated on Feb. 20, 2019.*

*Primary Examiner* — Binh Q Tran
(74) *Attorney, Agent, or Firm* — Stuart L. Wilkinson

(57) ABSTRACT

Techniques are disclosed to aid fixing of an elongate wire within an elongate, linear cell of a honeycomb ceramic substrate unit for a gaseous emissions treatment assembly. In one method, the wire is formed with a resiliently flexible element, and inserted into the cell, the insertion act causing the resiliently flexible element to flex and to cause a part of the element to bear against a wall of the cell and so provide frictional retention of the wire in the cell. In another, method, an adhesive is used either on the outside of the wire or the inside of the cell. In another method, the wire is scored at spaced intervals along its length to provide relief spaces for linear expansion of the wire to reduce stress at its interface with cell walls.

12 Claims, 4 Drawing Sheets

Related U.S. Application Data is a continuation of application No. 14/452,800, filed on Aug. 6, 2014, now Pat. No. 9,488,085.

(60) Provisional application No. 61/879,211, filed on Sep. 18, 2013, provisional application No. 61/910,067, filed on Nov. 28, 2013, provisional application No. 62/426,258, filed on Nov. 24, 2016.

(51) Int. Cl.
  *B01J 35/04* (2006.01)
  *F01N 3/20* (2006.01)
  *F01N 9/00* (2006.01)
  *H05B 6/10* (2006.01)

(52) U.S. Cl.
  CPC ......... *F01N 3/2013* (2013.01); *F01N 3/2026* (2013.01); *F01N 9/00* (2013.01); *H05B 6/108* (2013.01); *F01N 2240/05* (2013.01); *F01N 2510/00* (2013.01); *F01N 2900/0602* (2013.01); *Y02T 10/12* (2013.01)

(58) Field of Classification Search
  USPC .......................................... 60/274, 275, 299
  See application file for complete search history.

(56) References Cited

U.S. PATENT DOCUMENTS

| | | | | |
|---|---|---|---|---|
| 4,523,935 | A | * | 6/1985 | Takagi ............... B01D 39/2093 219/205 |
| 4,897,096 | A | * | 1/1990 | Pischinger ......... B01D 46/0063 55/283 |
| 4,979,364 | A | * | 12/1990 | Fleck ...................... B03C 1/023 55/466 |
| 5,562,885 | A | * | 10/1996 | Bayer ..................... F01N 3/281 422/174 |
| 5,569,455 | A | * | 10/1996 | Fukui .................... F01N 3/2807 422/174 |
| 8,292,987 | B2 | * | 10/2012 | Gonze .................. F01N 13/009 95/1 |
| 10,143,967 | B2 | * | 12/2018 | Crawford ........... B01D 53/9418 |
| 2006/0204408 | A1 | * | 9/2006 | Son ........................ B01D 53/32 422/177 |
| 2009/0035194 | A1 | * | 2/2009 | Robel .................. F01N 3/0231 422/177 |

\* cited by examiner

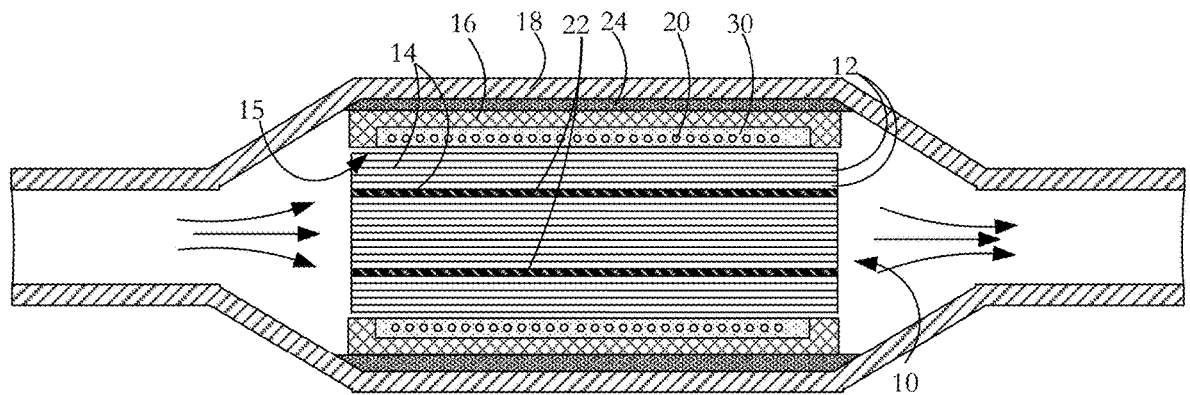
FIG. 1
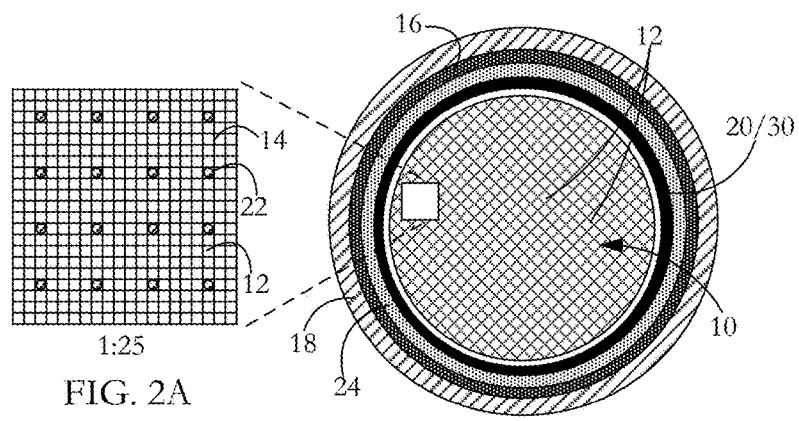
FIG. 2A
FIG. 2
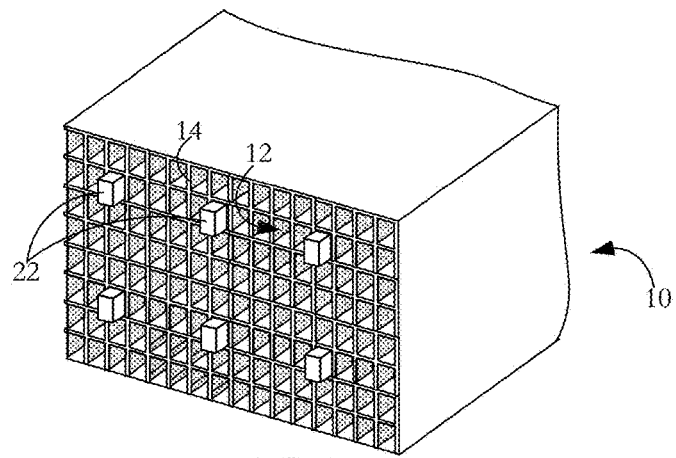
FIG. 3

RETENTION OF WIRES IN AN INDUCTION HEATED GASEOUS EMISSIONS TREATMENT UNIT

CROSS REFERENCE TO RELATED PATENTS

The present application claims priority pursuant to 35 USC 120 as a continuation-in-part of U.S. patent application Ser. No. 15/259,858 filed Sep. 8, 2016 entitled "Gaseous emissions treatment structures with induction heating" which is a continuation of U.S. patent application Ser. No. 14/452,800 filed Aug. 6, 2014 entitled "Catalytic converter structures with induction heating" which claims priority pursuant to 35 U.S.C. 119(e) from 61/879,211, entitled "Catalytic converter employing electrohydrodynamic technology" filed Sep. 18, 2013 and from U.S. provisional application 61/910,067 entitled "Catalytic converter using field heating of metal component" filed Nov. 28, 2013. The present application further claims priority pursuant to 35 U.S.C. 119(e) from U.S. provisional application 62/426,258, entitled "Methods for retaining wires in an induction heated gaseous emissions treatment unit", filed Nov. 24, 2016. The disclosures of the above-numbered applications are hereby incorporated herein by reference in their entirety and made part of the present application for all purposes.

FIELD OF THE INVENTION

This invention relates to methods for retaining wires in an induction heated gaseous emissions treatment unit and has particular but not exclusive application to such methods for use in the manufacture of catalytic converters, particulate filters (PFs) and like structures for treating exhaust gases to reduce harmful pollution.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and particulate filters are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and PFs have low efficiency when cold, i.e. the running temperature from ambient air start-up temperature to a temperature of the order of 300 C or "light-off" temperature, being the temperature where the metal catalyst starts to accelerate the pollutant conversion processes previously described. Light-off is often characterized as the temperature at which a 50% reduction in toxic emissions occurs and for gasoline is approximately 300° C. Below light-off temperature, little to no catalytic action takes place. This is therefore the period during a vehicle's daily use during which most of the vehicle's polluting emissions are produced. Getting the catalytic converter or PF hot as quickly as possible is important to reducing cold start emissions.

Copending U.S. patent application Ser. No. 14/452,800 (Catalytic converter structures with induction heating) shows a catalytic converter assembly having a substrate body with a plurality of cells for cell therethrough of exhaust gases. Metal is located at predetermined locations in the substrate body and an electromagnetic field generator is mounted adjacent the substrate body for generating a varying electromagnetic field inductively to heat the metal and so heat the substrate body.

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 1 is a longitudinal sectional view of a gaseous emissions treatment unit made using a method according to an embodiment of the invention.

FIG. 2 is a cross-sectional view of the gaseous emissions treatment unit of FIG. 1.

FIG. 2A is a detail end view to a larger scale of a part of the treatment unit illustrated in FIG. 2.

FIG. 3 is a perspective detail view of a part of the treatment unit illustrated in FIG. 2.

Figure 4:
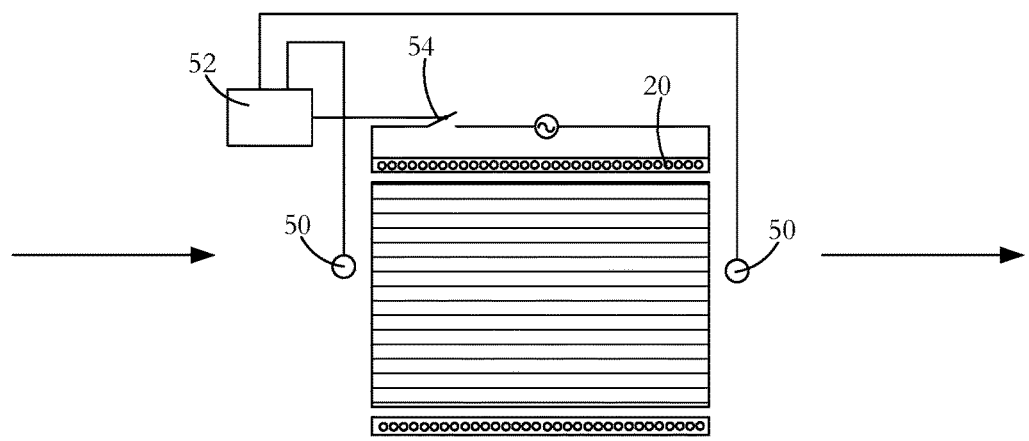
FIG. 4 is a schematic view of a control system for the gaseous emissions treatment unit of FIG. 1.

DETAILED DESCRIPTION OF THE INVENTION INCLUDING THE PRESENTLY PREFERRED EMBODIMENTS

A gaseous emissions treatment assembly may take any of a number of forms. Typical of these is a catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls 14 are typically in the range 0.003 to 0.008 inches in thickness. Typically, the ceramic substrate body 10 is formed in an extrusion process in which green ceramic material is extruded through an appropriately shaped die and units are cut successively from the extrusion, the units being then cut into bricks. The areal shape of the cells or passages 12 may be whatever is convenient for contributing to the overall strength of the substrate body 10 while presenting a large contact area at which flowing exhaust gases can interact with hot catalyst coating layer 15 lining the interior walls of the cells. Catalyst particles are contained in a wash coat which is deposited onto the cell walls in the course of production. A suitable wash-coat contains a base material, suitable for ensuring adherence to the cured ceramic material of the substrate body, and entrained particulate catalyst material for promoting specific pollution-reducing chemical reactions. While the cell walls 14 are coated with a catalyst 15 if the assembly is to function as a catalytic converter, the walls may be either uncoated or coated if the assembly is to function as a particulate filter.

Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that the brick presents catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_x$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems.

A gaseous emissions treatment assembly may have a series of the substrate bodies or bricks 10, each having a different catalyst layer depending on the particular noxious emission to be neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls can be formed so as to be thicker than other of the walls, or formed so that there is some variety in the shape and size of cells. Junctions between adjacent interior cell walls can be sharp angled or can present curved profiles.

Typically, as shown in FIG. 1, the wash-coated ceramic honeycomb brick 10 is wrapped in a ceramic fibrous expansion blanket 16. A stamped metal casing or can 18 transitions between the parts of an exhaust pipe (not shown) fore and aft of the gaseous emissions treatment unit so as to encompass the blanket wrapped brick. The casing 18 is typically made up of two parts which are welded to seal the brick in place.

The expansion blanket 16 provides a buffer between the casing 18 and the brick 10 to accommodate their dissimilar thermal expansion coefficients. The metal of the sheet metal casing 18 expands much more than the ceramic material of the brick at a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body.

In use, the encased brick (or bricks) is mounted in the vehicle exhaust line to receive exhaust gases from the engine and to pass them to the vehicle tail pipe. The passage of exhaust gases through the gaseous emissions treatment unit heats the ceramic brick to promote catalyst activated processes where the flowing gases contact the catalyst layer. Especially when the vehicle engine is being run at optimal operating temperature and when there is substantial throughput of exhaust gases, such treatment units operate substantially to reduce the presence of noxious gaseous emissions entering the atmosphere. Such units have shortcomings however at start-up when the interior of the brick is not at high temperature and during idling which may occur frequently during city driving or when waiting for a coffee at a Tim Hortons drive-through.

Brick shape, profile and cell densities vary among different manufacturers. For example, some bricks are round and some are oval. Some assemblies have single stage bricks that are generally heavily wash-coated with the catalyst metals, while others may have two or three bricks with different wash-coatings on each brick. Some exhausts have 900, 600 and 400 cpsi cell densities used in the full exhaust assembly, while others use only 400 cpsi bricks throughout. A close-coupled converter may be mounted up close to the exhaust manifold with a view to reducing the period between start-up and light-off temperature. An underfloor catalytic converter can be located further from the engine where it will take relatively longer to heat up but be relatively larger and used to treat the majority of gases once the exhaust assembly is up to temperature. In another configuration, a unit for reducing the period to light-off temperature and a unit to deal with high gas flow after light-off are mounted together in a common casing.

At one or more locations in the assembly, sensors are mounted in the exhaust gas flow, including within or adjacent the substrate body, to provide feedback to the engine control system for emission checking and tuning purposes. Aside from start-up, control of fuel and air input has the object typically of maintaining a 14.6:1 air: fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter.

The brick 10 illustrated in the gaseous emissions treatment assembly of FIGS. 1 to 3 is modified to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000 s to 1,000,000 s cycles per second (Hz) depending on the material, mass, and shape of the ferromagnetic metal body. Magnetic domain polarity is not easily reversed and the resistance to reversal causes further heat generation in the metal.

As illustrated in FIGS. 1 and 2, surrounding the ceramic substrate body is a metal coil 20 and located within selected cells 12 are metal pins or wires 22 (FIGS. 1-3). By generating a varying electromagnetic field at the coil 20, a chain reaction is initiated, the end result of which is that after start-up of a vehicle equipped with an exhaust system embodying the invention, light-off may be attained more quickly in the presence of the varying electromagnetic induction field than if there were no such field. The chain reaction is as follows: the varying electromagnetic field induces eddy currents in the metal pins 22; the eddy currents cause heating of the metal elements; heat from the metal elements 22 is transferred to the walls 14 of the ceramic substrate; heat from the heated substrate body is transferred to exhaust gas as it passes through the converter and to the catalyst coating 15; and the heated exhaust gas and heated catalyst cause the catalytic reactions to take place more quickly compared to exhaust gas that has not been subjected to supplementary induction heating. Conduction from the heated wires 22 is the primary source of heat transfer to the ceramic substrate 10 and therefore to the exhaust gases when the converter is in operation. There is also a small amount of convective and radiated heat transfer at any small air gaps between a wire 22 and the interior surface of the cell 12 within which it is contained.

The coil 20 is a wound length of copper tube, although other materials such as copper wire or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter. An air gap between the coil 20 and the nearest inductance metal wires 22 prevents significant heat transfer from the wires 22 to the coil 20 which would otherwise increase the coil resistivity and so lower its efficiency.

A layer 24 of electromagnetic field shielding material is located immediately outside the coil 20 to provide induction shielding and to reduce induction loss to the metal converter housing. The shielding layer also acts to increase inductive coupling to the wires 22 to focus heating. The magnetic shield 24 can be made from a ferrite or other high-permeability, low-power-loss materials such as Giron, Magnet-Shield, Papershield, Finemet, CobalTex, or other magnetic shielding material that can arranged to surround some or all of the windings of the coil 20. In particular, the magnetic shield 24 operates as a magnetic flux concentrator, flux intensifier, diverter, or flux controller to contain the magnetic fields within the substrate body. The magnetic shield lowers loss by mitigating undesirable heating of adjacent conductive materials. Without the magnetic shield, magnetic flux produced by the coil 20 could spread around the coil and link with the electrically conductive surroundings such as the metal casing 18 and other surrounding metal in an exhaust system, and/or other components of an internal combustion engine, vehicle, generator or other electrical system or host system, decreasing the life of these components and increasing energy loss. In addition, the magnetic shield 24 operates to direct the magnetic field to the substrate body 10 providing selective or enhanced heating of a desired region of the substrate body, for example, by redirecting magnetic flux that would otherwise travel away from that desired region. In particular, the magnetic shield can operate to concentrate the magnetic flux produced by the coil 20 in the direction of the metal wires or rods 22 in the substrate body 10 for more efficient heating. As an additional benefit, the magnetic shield can improve the electrical efficiency of the induction coil 20 by increasing power transfer.

The coil 20 is contained in a fiber insulation sheath with the sheathed coil being encased in a cast, cured insulation 30. The cast insulation functions both to stabilize the coil position and to create an air-tight seal to confine passage of the exhaust gases through the ceramic honeycomb substrate body 10 where catalytic action takes place. The insulation also provides a barrier to prevent the induction coil 20 from shorting on the converter can 18 or the ferrite shield 24. The insulation is suitable alumino-silicate mastic. In an alternative embodiment, the substrate body is wrapped in an alumino-silicate fiber paper. In one manufacturing method, the copper coil 20 is wrapped around the substrate body and then placed in the casing or can 18. In an alternative manufacturing method, the coil 20 is placed in the can 18 and the substrate body 10 is inserted into the coil/can assembly.

In operation, a varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements. A suitable power input to a single brick coil is of the order of 1.1 kw.

The induction heating process may be applied before start-up or at any time during normal running of the power plant from which gaseous emissions emanate. As shown in the schematic view of FIG. 4, one or more temperature sensors 50 mounted in the catalytic converter are used to monitor temperature at any time and can be suitably deployed to monitor temperature at different locations in the catalytic converter or particulate filter. Outputs from the temperature sensors 50 are taken to a controller 52 at which the monitored temperature or temperatures are used to control through switches 54 the times at which the induction process is used. Using an appropriate algorithm implemented at the controller 52, the monitored temperatures may also be used to control specific effects of the applied induction heating process in implementations where the induction field characteristics are selectable to achieve a particular induction heating pattern. Structures and operating methods as described above for supplementary heating or preheating parts of a catalytic converter or particulate filter can be used with each of a close-coupled catalytic converter, an under-floor converter, or a combination of the two.

Field produced by the electromagnetic induction coil 20 can be tuned to the metal wire load to achieve high efficiency in terms of generating heat and speed to light-off. Heating effects can be modified by appropriate selection of any or all of (a) the electrical input waveform to the coil, (b) nature and position of passive flux control elements, and (c) nature, position, and configuration of the coil. In particular, the heating pattern can be determined by appropriate location and configuration of the metal wires. In addition, the applied field can be changed with time so that there is interdependence between the induction field/heating pattern and the particular operational phase from pre-start-up to highway driving. In an alternative configuration, more than one coil can be used to obtain desired induction effects.

In the embodiments of FIGS. 2A and 3 which show a small part of the substrate body 10, the wires 22 are arranged in a regular array as viewed from one end of the substrate body or in cross-section across it. In FIG. 2A, there is a metal wire 22 at every $5^{th}$ cell viewed vertically and horizontally (1:25). A 1:25 array in a 400 cells per square inch (cpsi) substrate has a satisfactory heating performance and not too great an occlusion of converter cells from the viewpoint of pollution-cleaning catalytic reactions implemented when operated as a catalytic converter or PF. A significantly higher ratio of wires to cells can result in slower heating to light-off because of the high overall thermal capacity represented, in total, by the wires and because of the fact that some wires block the "line of sight" field effect on other wires. In contrast, while a significantly lower ratio of wires to cells results in fewer occlusions of converter cells, a sparse distribution of metal results in reduced heat generation and increased time to light-off.

A uniform wire array such as that shown in FIG. 2A does not normally produce uniform heating or a uniform temperature through the substrate body although it may provide rapid heating and a generally uniform temperature profile for smaller substrate bodies, typically 4 inches in diameter or less, because, in that case, all wires are relatively close to the coil. Such a small substrate body may be used for small displacement gasoline engines. For substrate bodies larger than 4 inches in diameter, induction heating from a uniform wire array pattern has lower electrical and thermal efficiency. Because magnetic flux from the coil is strongest closest to the coil and weakens further away from the coil, a metal wire closer to the source of the induction field becomes hotter and becomes hot more quickly than an equivalent metal wire located further away from the source. In such substrate bodies, the magnetic flux is not as uniform as in the smaller substrate bodies. Center and outer located wires do not experience similar levels of magnetic flux as the magnetic flux drops off drastically with distance from the coil.

The array of wires can be distributed non-uniformly in order to get a desired induction heating profile. The non-uniformity can be along an axis parallel to the elongate cells or can be in a plane perpendicular to the axis. The coil position and characteristics can also be altered so as to match the wire distribution. Instead of a single wire extending the full length of the cell, a segment of wire or two segments of wire are inserted in the cell. Once again, this is done to effect a desired heating profile. In the case of a pair of segments, the insertion techniques are performed at both ends of the substrate, with the substrate position being reversed between insertions. Whether a wire extends the full length of a cell or only partially along its length, the particular occupied cell is rendered compromised or unusable in terms of promoting a catalytic reaction to remove noxious components of exhaust gas passing through the catalytic converter or particulate filter. This adverse effect can, in an alternative embodiment, however, be mitigated to some effect by using hollow wires.

In a preferred structure, a wire outer profile and the corresponding cell inner profile are closely matched to maximize heat transfer from the inductively heated wires to the walls of the ceramic substrate. Nominally square section wires, in particular, provide good heat transfer to the square section cells due to high contact area between the two materials. Clearly, the cross-sectional area of the wire must be slightly smaller than that of the cell in order to permit wire insertion. As shown in FIG. 3, the interior walls 14 of the cells 12 are coated with a catalyst 15 if the assembly is to function as a catalytic converter but may be uncoated or coated if the assembly is to function as a particulate filter.

In the course of regular operation of a catalytic converter or particulate filter such as, for example, when driving a vehicle, the steel wires occupying selected ones of the ceramic substrate cells are subject to gravity, vibration, temperature cycling, and exhaust gases pressure, any or all of which could dislodge a wire if it is not effectively retained within the cell. In the worst case, this could result in a wire falling out of the ceramic substrate which, in turn, would reduce system performance because power supply to the inductive heated system is typically tuned for a specific application. An unanchored wire might also damage downstream components. It is desirable therefore that the wires are retained in selected cells.

In one embodiment, wire retention forces are developed by means of a friction fit which is at least partially achieved by closely matching the wire exterior area dimensions to the cell area dimensions so that surface roughness and/or natural undulations in the surface of the pulled wire stock and the cell walls holds the wires in place. Wire is drawn to be from 0.002 inches to 0.005 inches less in width than the cell width to enable insertion. The tolerance between wire and cell will depend to some extent on whether cell walls are coated with catalyst washcoat layer (catalytic converters) or bare (particulate filters).

Figure 5:
FIG. 5 is a side view of a wire prior to insertion into a substrate of the form shown in FIG. 3.
Figure 6:
FIG. 6 is a side sectional view of a fragment of a substrate of the form shown in FIG. 3 with the wire of FIG. 5 inserted in the substrate and retained therein by a method according to an embodiment of the invention.
Figure 7:
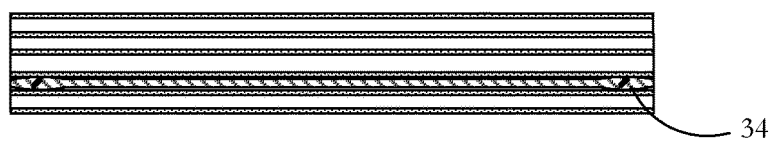
FIG. 7 is a side sectional view of a fragment of a substrate of the form shown in FIG. 3 with different form or wire inserted in the substrate and retained therein by a method according to an embodiment of the invention.
Figure 8:
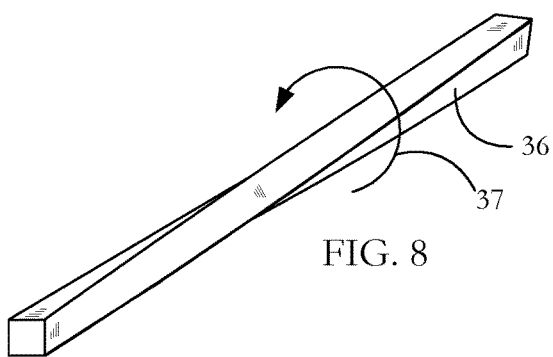
FIG. 8 is an isometric view of a yet another form or wire prior to insertion into a substrate of the form shown in FIG. 3.
Figure 9:
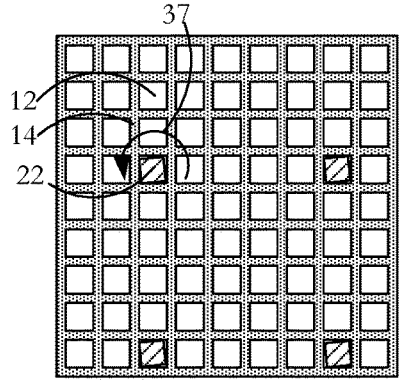
FIG. 9 is a detail end view of the substrate illustrated in FIG. 3 with wires of the form shown in FIG. 8 inserted into selected cells and retained there by a method according to an embodiment of the invention.

With reference to FIGS. 5 to 7, wires 22 are alternatively formed with a resiliently flexible element such as a bow 32 (FIGS. 5 and 6) or a crimp 34 (FIG. 7) so that the bow or crimp is straightened somewhat from a rest condition as shown in FIG. 5 as the wire is inserted into a cell to a flexed condition as shown in FIG. 6. The wire is held by the cell walls as the inherent resilience of the wire tries to return the wire to its original bow or crimped shape causing at least a part of the wire to bear against a part of the cell walls 14 and so enhance the friction fit to retain the wire in place. In a further embodiment shown in FIGS. 8 and 9, stock wire is pulled so that the length of wire 22 has a twist in a first direction about its longitudinal axis. The degree of twist is selected so as not to cause an excessive reactive force when first loading the wire into cell of the ceramic substrate. The wire 22 is caused to twist in the opposite direction by the act of threading the wire into a selected cell and is held by the cell walls 14 as the inherent resilience of the wire seeks to restore the original twist.

Figure 10:
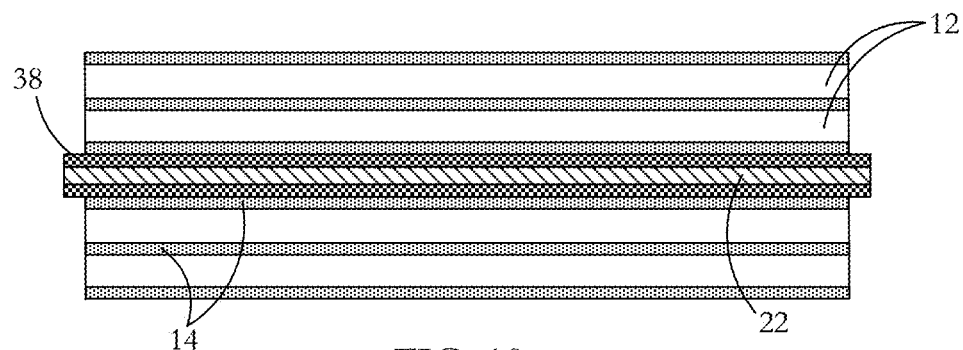
FIG. 10 is a longitudinal sectional view of part of the substrate of FIG. 3 showing a wire insert fixed according to an embodiment of the invention.
Figure 11:
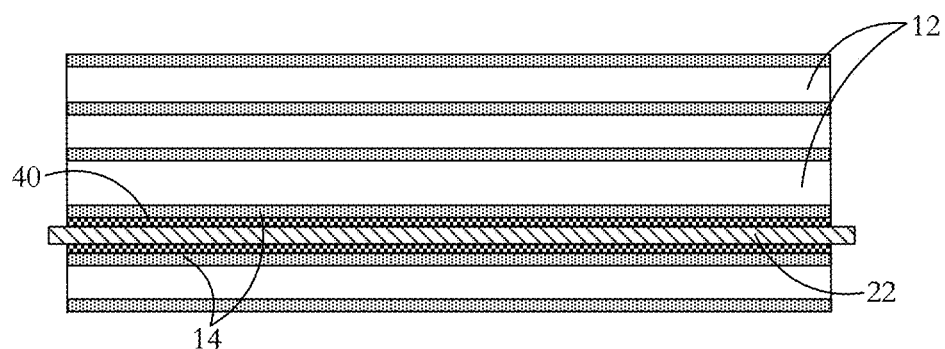
FIG. 11 is a longitudinal sectional view of part of the substrate of FIG. 3 showing a wire insert fixed according to another embodiment of the invention.

With reference to FIGS. 10 and 11, wires may alternatively, or in addition, be fixed into the cells by bonding outer surfaces of the wires to interior surfaces of respective cells. In exemplary bonding processes, the wire is at least partially covered with a coating 38 of an adhesive/mastic before wire insertion (FIG. 10), or a small amount of adhesive/mastic is applied as a coating 40 onto the cell interior walls 14 before wire insertion (FIG. 11). High temperature mastic materials and composite adhesives are used. A suitable exemplary mastic is a low viscosity, paste-like mixture of glass fibers, clay slurry, polymer binder and water, from which the water and the organic binder are driven off in the course of the curing process. A suitable exemplary composite adhesive is a blend of ceramic and metal powders with a binder transitioning between the two. Once the mastic adhesive is in place, the ceramic substrate/pin assembly is placed into a powered induction coil which is energized to heat the wires. This drives of moisture in the course of which the mastic expands owing to the vapour forming pores in the mastic as it escapes. The organic binder polymerizes to render the expanded matrix rigid and to provide adherence of the wires to the walls of the ceramic substrate. Once the matrix is solid, it is heated further to drive off the remaining organic content. The blend components are selected to minimize adverse temperature cycling stress effects in which there may be significant expansion/contraction of the metal wire but vanishingly small expansion/contraction of the ceramic substrate. This differential could otherwise produce stresses at the adhesive interface between the wire and the ceramic substrate material. By using such a composite adhesive, movement of a bonded wire relative to the surrounding cell walls may be reduced while maintaining high heat transfer.

Figure 12:
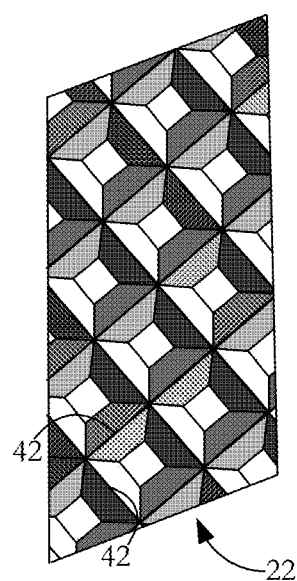
FIG. 12 is a side view of one face of a wire for insertion and retention in a ceramic honeycomb substrate of the form shown in FIG. 3.

In a variation, a heat activated, dry adhesive is used to avoid the messiness of wet gluing the wires into place during insertion. A knurled or otherwise textured surface configuration is first formed in the wire surface as shown in FIG. 12 and the knurls 42 or other indentations are filled with a glue/wax that is stable and solid at room temperature but which at least partially liquefies at an elevated temperature <100° C. The ceramic core/substrate with inserted wires is put into an induction coil to heat the wires which in turn melts the glue coated in the knurls. Further heating cures the glue in place by driving off any water and wax or other solvent. The wax/glue is mixed with ceramic mastic. When the wax/glue is driven off, the ceramic mastic remains to stick the wire to the ceramic wall. In an exemplary manufacturing process, the substrate is first inserted into a vat of heat-actuatable adhesive and allowed to dry. Wires are then inserted into selected cells either singly or using a carrier into which several wires to be inserted are gripped, the carrier then being brought to a front face of the ceramic brick in the course of a machine vision and sensor enhanced placement process. Once the wires are in place in the cells, the carrier releases the wires and related probes push the wires to the required positions in the respective cells, the assembly then being heated to actuate the adhesive. The knurled or otherwise indented wire surface can be used both for the heat activated adhesive and regular mastic adhesive combinations. Other forms of indentation can be adopted such as a series of spaced grooves, the grooves extending lengthwise along the wires or transversely around them.

Referring to FIGS. 13 to 18, there are shown alternative wire structures for reducing the adverse effect of operational temperature cycling on the retention of wires within cells of the ceramic substrate. The wires 22 expand when the temperature of the steel increases as a result of the induction heating and the passage of hot exhaust gases along the unit. When regular operation ceases, the wires cool and contract. Because of the high aspect ratio (length to width) of the steel wire, the accumulated expansion (and contraction) is significantly greater along the length of a wire than across its width. In addition, the expansion of the wire for a particular temperature increase is significantly greater than the expansion of the ceramic substrate material surrounding the wire because the materials have different coefficients of thermal expansion. For example, cordierite, which is commonly used as the substrate material, has a thermal expansion coefficient about 10 times less than that of stainless steel. Consequently, and especially in the length direction, this results in repeated small differential, longitudinal displacements of the wire surface relative to the ceramic wall surface. With such differential expansion, the retention of a wire within a selected cell may be negatively affected, whether the retention is by means of a friction fit between the wire and the cell walls, by an adhesive bond between the wire and the walls, or both.

Figure 13:
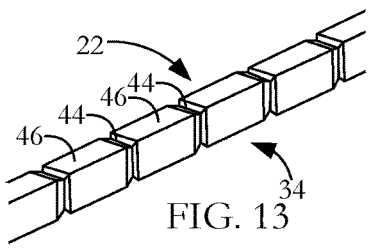
FIG. 13 is an isometric view of another form of wire for insertion and retention in a ceramic honeycomb substrate of the form shown in FIG. 3.
Figure 14:
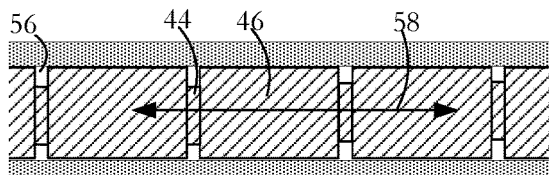
FIG. 14 is a longitudinal sectional view of a fragment of a ceramic honeycomb substrate showing the wire of FIG. 13 inserted wire inserted into the substrate and retained there by a method according to another embodiment of the invention.
Figure 15:
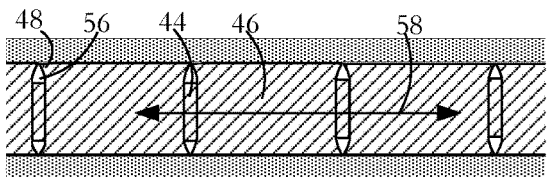
FIG. 15 is a longitudinal sectional view corresponding to FIG. 14 but showing the substrate and wire after wire expansion has taken place.

The modified wire of FIGS. 13 to 15 has a structure somewhat akin to a string of sausages with a series of alternating reduced thickness sections 44 and regular wire thickness sections 46. In one example, the reduced sections 44 are of the order of one 10 thousandth of an inch in length compared to 0.375 to 0.5 inches in length for the regular wire thickness section 46s. In this example, the cross-sectional area of the reduced sections 44 is about two thirds of the area of the regular sections 46. The effect of sectioning the wire as shown is that at outer regions of the wire 48, the wire material expands longitudinally into relief gaps 56 as shown in FIG. 15. At the center 58 of the reduced thickness sections 44 which connect the full diameter sections 46, the wire core is prevented from expanding fully along the axis by the constraining influence of the surrounding separated full diameter section and by a heightened radial expansion compared to the regular wire form. By maintaining the uninterrupted central core 58, induction heating effects are maintained. The structure means that the wire 22 and the substrate 10 have much closer longitudinal thermal expansions than the respective thermal expansion coefficients of the two materials might suggest.

Figure 16:
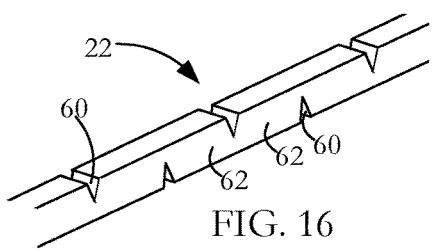
FIG. 16 is an isometric view of a further form of wire for insertion and retention in a ceramic honeycomb substrate of the form shown in FIG. 3.
Figure 17:
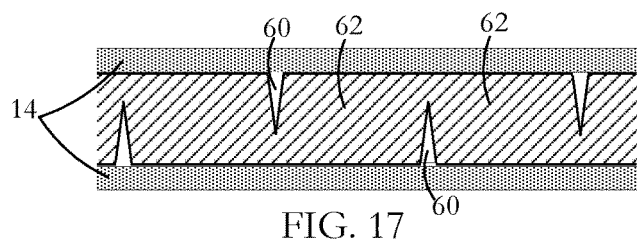
FIG. 17 is a longitudinal sectional view of a fragment of a ceramic honeycomb substrate showing the wire of FIG. 16 inserted wire inserted into the substrate and retained there by a method according to another embodiment of the invention.
Figure 18:
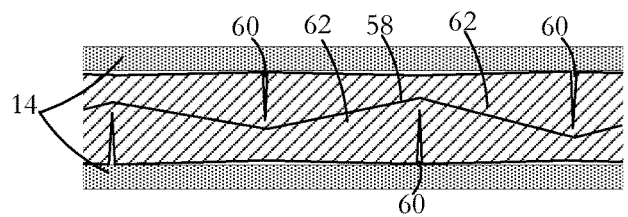
FIG. 18 is a longitudinal sectional view corresponding to FIG. 17 but showing the substrate and wire after wire expansion has taken place.

In the alternative embodiment of FIGS. 16 to 18, there is a reduction in cross-section caused by a notch 60 cut into one face of the wire and then a similar reduction with a notch cut into the opposite side with the two notches flanking a segment 62 of the wire. The cuts or notches can be formed by any suitable means during wire production or subsequently. When installed, an uninterrupted "zig zag" core region 58 extends along the wire and ensures that induction heating effects are maintained. Upon expansion, the notches 60 act as relief regions and are at least partially closed by the expanding metal. As shown in FIG. 18, the segments 62 undergo some torsional movement which can further absorb/reduce the overall linear thermal expansion of the wire.

In a further embodiment, the contained wired is completely segmented. Here, the segments are touching but not physically linked and each segment can move freely relative to each adjacent segment in all directions. Such a design is a compromise however because there is reduced electrical continuity between the segments within a given cell. Full segmentation creates a barrier that inhibits conduction and negatively affects induction heating efficiency. In each of the FIGS. 13 to 18 embodiments, ceramic glue can be deposited into the relief regions before wires are loaded into the ceramic substrate.

A suitable metal for the wires is a ferromagnetic metal such as stainless steel grade 430 which has high magnetic permeability and corrosion resistance. Lower permeability alloys such as 300 or 400 series stainless steels may also be used. Alternative metals can be used depending on particular properties required in making the wire inserts and in fixing inserts within selected cells of the ceramic substrate. Such properties include metal formability, ductility, softness and elasticity. For shaping the direction and strength of magnetic flux in the substrate, lower magnetic permeability metals or alloys may be used for metal inserts in the outer cells with relatively higher magnetic permeability metals being used for metal inserts in the inner cells. Metals having very high magnetic permeability may also be used. For example, Kanthal iron-chrome-aluminum alloys used in wires manufactured by Sandvik have a relative permeability of 9000 and greater. High relative permeability can be achieved using wires made of other alloys including nickel-iron and iron-cobalt alloys.

Although the embodiments of the invention have been described in terms of metal wires in a ceramic substrate, in another aspect of the invention, a non-metal conductor such as graphite is used for the wires/pins/rods, these elements being used in a substrate made of cordierite for example. The use of graphite effectively obviates the need to compensate for differential expansion between the graphite rods and the cordierite honeycomb because the coefficients of thermal expansion for graphite and cordierite are quite similar. Consequently, there is little stress build-up notwithstanding that the materials have in other respects markedly dissimilar properties. In terms of operation performance of a gaseous emissions treatment apparatus using this combination, high power levels can be maintained for longer times with graphite pins (compared with metal) as the curie temperature, at which ferromagnetic materials become paramagnetic and lose magnetism, is not a characteristic of graphite. The curie point is a limit of most magnetic metals and generally occurs between 650 and 700° C. Graphite can be heated to the allowable temperature limit of the ceramic substrate. However, in comparison with metal wires, more power is required for a given temperature as graphite has no magnetic hysteresis and has higher resistivity than ferromagnetic metals.

As noted, the lengths, shapes and distribution of the wires and segments can be tuned for a desired heating level and distribution. In addition, for all embodiments described in this specification, heat transfer characteristics of the material of the substrate body also influence the heating effect and therefore are considered when selecting the locations of the wires or wire segments. For example, cordierite and silicon carbide are suitable materials for the substrate body, with cordierite having a relatively low heat transfer coefficient and silicon carbide having a relatively high heat transfer coefficient. As a result, silicon carbide can be provisioned with fewer heating wires than cordierite for the same heating effect. The magnetic field and heating effect using can alternatively be implemented using metal wires where one wire may have inductance properties different from another. In one such implementation, the magnetic permeability of wires positioned near the outside of the substrate body is lower than the magnetic permeability of wires positioned near the inside of the substrate body so as to distribute the magnetic flux as desired. In one example, wires near the center of the substrate body are made of 430 stainless steel and wires near the outside of the substrate body are made of 409 stainless steel. In another alternative, the permeability of a wire varies along its length, the variation, for example, being in stepped discrete increments. Generally, for inductive heating of the substrate body containing such wires, higher permeability materials or sections are placed in areas where greater heating is required and lower permeability materials where less heating is required. The resistivity of a metal wire also affects the way in which it is heated in the presence of a varying magnetic flux and therefore to obtain a desired differential response to the flux, the magnetic permeability and resistivity of the different wire regions are considered together.

In each of the above instances, the previously described insertion and fixing methods can be adopted with appropriate adjustments in the methods to accommodate the use of the particular wire profile and configuration. Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. A gaseous emissions treatment assembly comprising a honeycomb ceramic substrate body having a plurality of linear cells for the passage of emissions gas, metal wires inserted into and retained within respective ones of a first set of the plurality of cells, the cells of the first set having a cross-sectional shape generally matching the cross-sectional shape of the wires located therein except that the cells of the first set are marginally greater in cross-sectional area than the cross-sectional area of the wires located therein, the wires within the cells each formed with a resiliently flexible portion, having a rest condition and a flexed condition, the flexible portion driven by engagement with an interior wall of a respective cell from the rest condition to the flexed condition by the wire being inserted into said respective cell, whereby a part of the wire bears against said interior wall, thereby to provide frictional retention of the wire in said respective cell.

2. The assembly of claim 1, wherein the resiliently flexible portion is a bow form extending along at least a part of the respective wire.

3. The assembly of claim 1, wherein the resiliently flexible portion is a crimp in a part of the respective wire.

4. The assembly of claim 1, wherein the wire is made from wire stock pulled so that the wire has a twist in a first direction about its longitudinal axis, the wire has been caused to twist in the opposite direction by the act of threading the wire into a cell of the first set, and said resiliently flexible element is the inherent resilience of the wire seeking to restore the -twist in the first direction.

5. A gaseous emissions treatment assembly comprising a honeycomb ceramic substrate body having a plurality of linear cells for the passage of emissions gas, metal wire located in a first set of the cells, the cells of the first set each having a cross-sectional area shape generally matching the cross-sectional area shape of the wire located therein and being marginally greater in area than the cross-sectional area of the wire, the material of the wire having a higher coefficient of thermal expansion than the material of the ceramic substrate unit, the wire having reduced area regions that are spaced along the length of the wire to form relief regions whereby, when the assembly is subjected to a temperature increase, wire expansion forces developed at an interface between an inside cell surface and an outside wire surface are at least partially relieved by deformation of parts of the wire material into the relief regions.

6. A gaseous emissions treatment assembly comprising a honeycomb ceramic substrate body having a plurality of linear cells for the passage of emissions gas, metal wires located in a first set of the cells, the cells of the first set each having a cross-sectional area shape generally matching the cross-sectional area shape of the respective wire located therein and being marginally greater in area than the cross-sectional area of the respective wire, and a layer of adhesive bonding an outer surface of the metal wires to walls of respective cells of the first set thereof.

7. The assembly of claim 6, wherein indentations are formed in the surface of the wire to provide accumulation sites for the adhesive.

8. The assembly of claim 6, wherein the adhesive is a heat activated adhesive.

9. The assembly of claim 6, the adhesive being a blend including a ceramic powder component.

10. The assembly of claim 6, the adhesive being a blend including a metal powder component.

11. The assembly of claim 6, the adhesive being a blend including a binder component.

12. The assembly of claim 6, the adhesive being a blend including a wax component.

* * * * *